United States Patent [19]

Greene

[11] Patent Number: 4,877,349

[45] Date of Patent: Oct. 31, 1989

[54] WAVE ABATEMENT DEVICE

[75] Inventor: Richard M. Greene, Southold, N.Y.

[73] Assignee: Erosion Protection Devices, Incorporated, Southold, N.Y.

[21] Appl. No.: 200,049

[22] Filed: May 27, 1988

[51] Int. Cl.[4] .............................................. E02B 3/04
[52] U.S. Cl. ...................................... 405/27; 405/30
[58] Field of Search ...................... 405/21, 23, 25, 26, 405/27, 32, 33, 35, 27, 28, 30

[56] References Cited

U.S. PATENT DOCUMENTS

| 1,353,001 | 9/1920 | Uriarte | 405/35 |
| 1,397,025 | 11/1921 | White | 405/27 |
| 2,652,692 | 9/1953 | Hayden | 405/35 |
| 3,197,963 | 8/1965 | Frederiksen | 405/25 |
| 3,846,990 | 11/1974 | Bowley | 405/26 |
| 3,884,042 | 5/1975 | Anderson et al. | 405/27 |
| 4,073,145 | 2/1978 | Fair | 405/33 |
| 4,098,086 | 7/1978 | Desty et al. | 405/26 |
| 4,479,740 | 10/1984 | Schaaf et al. | 405/33 |

FOREIGN PATENT DOCUMENTS

| 1634155 | 9/1970 | Fed. Rep. of Germany | 405/26 |
| 3540824 | 5/1987 | Fed. Rep. of Germany | 405/22 |
| 1517957 | 2/1968 | France . | |
| 0091208 | 5/1983 | Japan | 405/27 |
| 0576047 | 5/1976 | Switzerland | 405/35 |
| 673689 | 7/1979 | U.S.S.R. . | |
| 1101503 | 7/1984 | U.S.S.R. . | |
| 1250608 | 8/1986 | U.S.S.R. | 405/21 |
| 0002494 | 11/1958 | United Kingdom | 405/35 |

OTHER PUBLICATIONS

Chapter 9 of the CRC Handbook of Coastal Processes and Erosion (1983).
Coastal Engineering, 8 (1984), pp. 199–217.
CRC Critical Reviews in Environmental Control, Sep. 1976, pp. 259–296.
Mark'Handbook for Mechanical Engineers, 8th ed., 1978, McGraw Hill.

Primary Examiner—Randolph A. Reese
Assistant Examiner—Arlen L. Olsen
Attorney, Agent, or Firm—Grimes & Battersby

[57] ABSTRACT

There is provided a wave attenuation device for abating waves and the erosion of a shorefront of a body of water. The device includes a plurality of rows of hollow tubes for receiving waves therethrough. Each tube in a row is in a side-by-side relation to its adjacent tubes and has its centerline positioned basically perpendicular to the shorefront. The device also includes a plurality of first and second horizontal supports, a plurality of vertical supports, and bracket and bolts for connecting one of the plurality of vertical supports to one of the first and one of the second horizontal supports to retain the plurality of rows of tubes in position with respect to each other. The device may include a structure to anchor the device in place in a body of water.

12 Claims, 5 Drawing Sheets

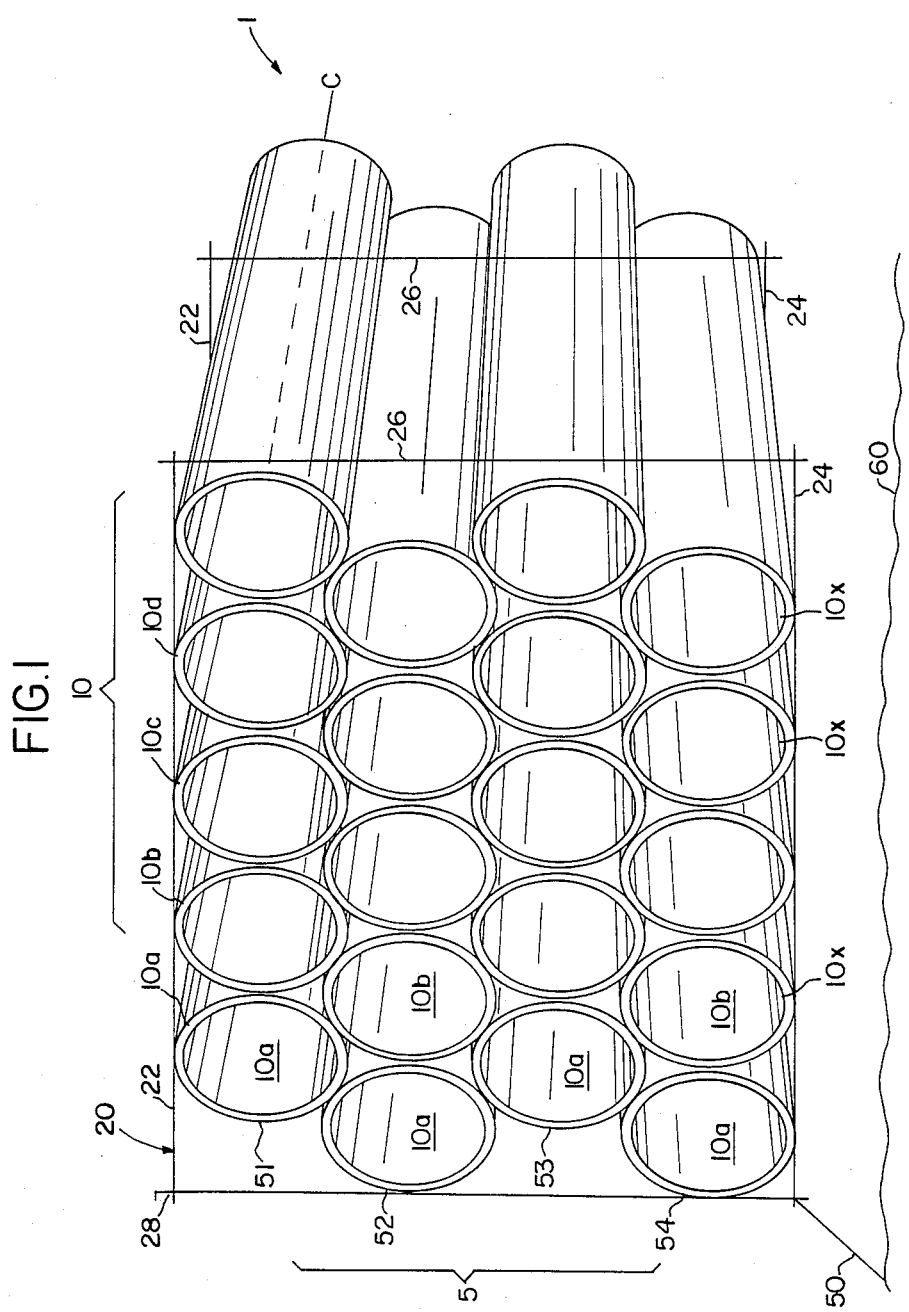

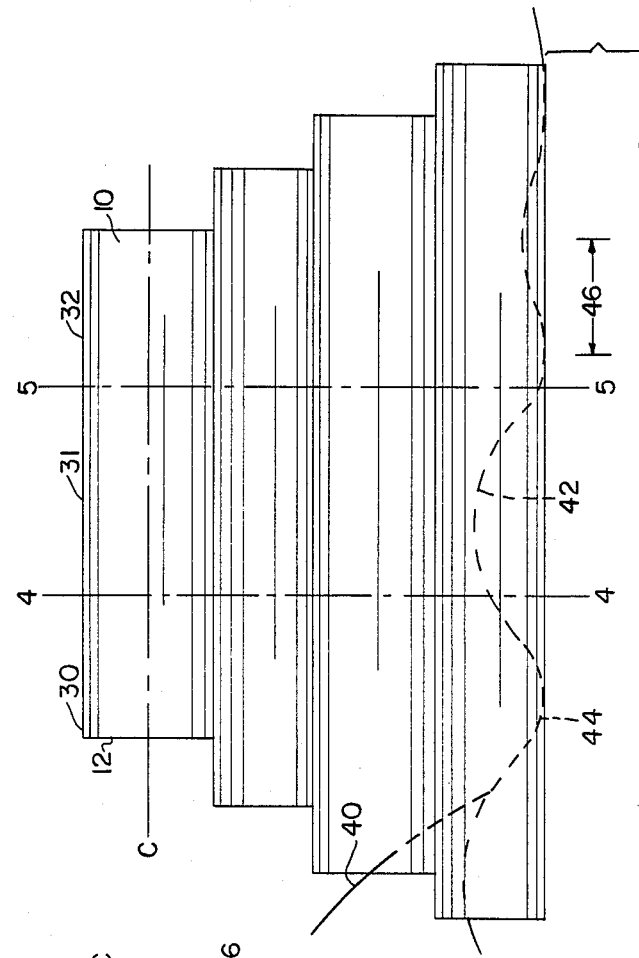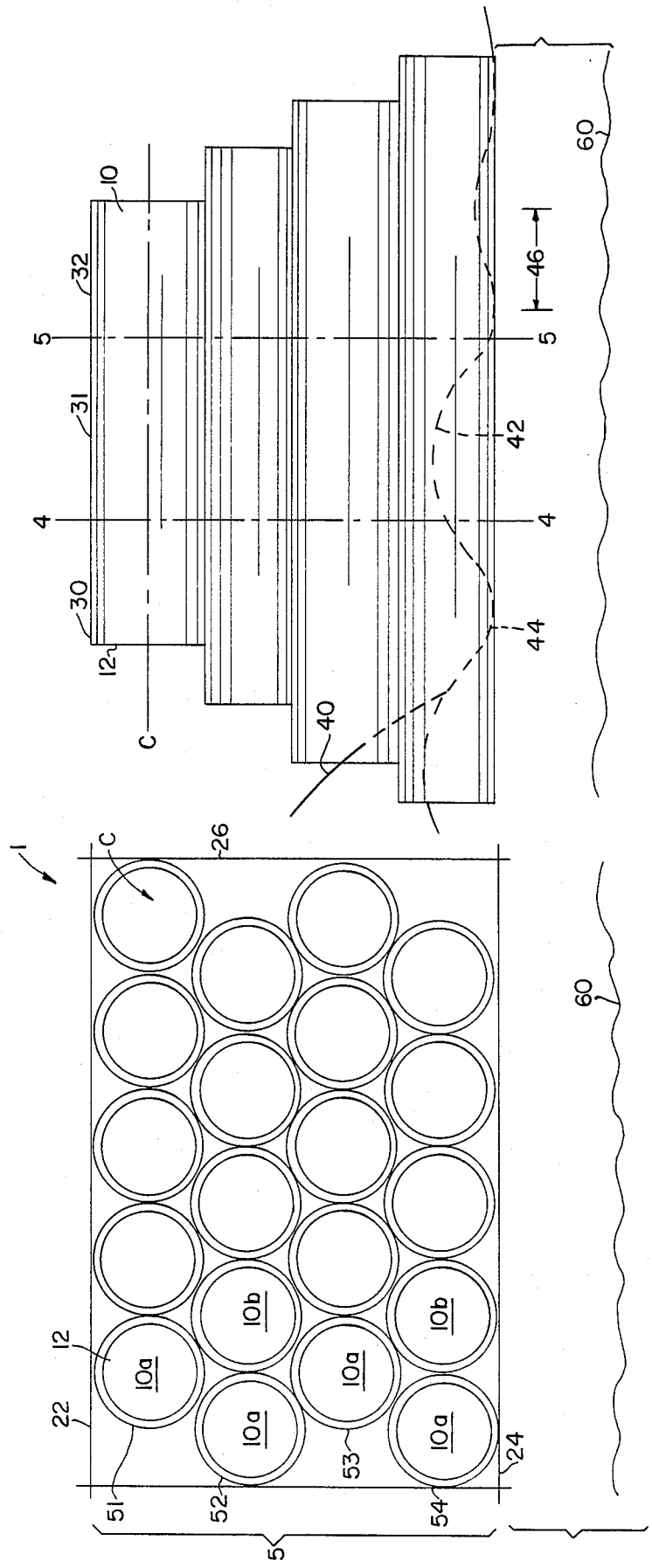

WAVE ABATEMENT DEVICE

BACKGROUND OF THE INVENTION

1. Field of the Invention

This relates to a wave and an erosion abatement device and, more particularly, to an abatement device which dissipates energy in waves and stops the chronic erosion process that occurs along shorefronts.

The ability of the shoreline or shorefront to withstand the force of the waves and therefore to withstand erosion is important particularly where there are homes, businesses and other structures present on the property or the property has an aesthetic appearance that needs to be maintained. Normally, such shorefront property is at a premium both in availability and cost. Erosion of shorefronts, as widely known, occurs because of storms and hurricanes, but, as less widely known, also occurs because of the daily, continuous effect of waves striking the shorefront. Specifically, the more turbulent or shorter period or higher frequency waves, with frequency being a function of the height and period of the wave, the less time the sand, which is carried in the wave, has to drain out onto the shorefront and also the less time sand already on the beach has to dissipate the force or energy of the wave and thereby prevent being carried away from the beach with the backwash of the wave. Concerning the latter, the water absorption capability of the beach, which is the important dissipator of wave energy, is decreased so that there results an increased backwash energy that moves the sand seaward.

A longshore movement of sand, known as littoral drift, has been found to be advantageous since it moves sand towards the shoreline thereby replenishing the beach or shorefront. Littoral drift has its greatest effect in replenishing the shorefront during calm water surges to the beach, which normally occur during late spring to mid-summer, since such surges provide more than adequate time to dissipate the energy of the wave so that there is virtually little, if any, backwash energy. Accordingly, the sand builds up on the beach or shorefront.

2. Description of the Prior Art

The two common ways to accomplish control of erosion along shorefronts are by non-structural and structural stabilization efforts. Non-structural efforts, which heretofore have been preferable, involve either the planting of beach grass which acts to capture sand, or the placing of large quantities of sand on the beach, or a combination of both. The planting of beach grass is still normally insufficient to retain enough sand to avoid erosion. The replacement of sand or the transporting of sand to a beach is very expensive as well as time consuming. Accordingly, no non-structural stabilization effort has proven totally satisfactory to abate erosion.

The variety of structural stabilization efforts include the building of walls, such as jetties and groins, perpendicular to the beach to trap sand and hence build up the beach, and the building of walls parallel to the beach, such as longard tubes, seawalls and bulkheads to deflect the waves, and therefore the wave forces, from striking the beach. Each of these structural stabilization efforts has proven to have serious drawbacks which include short design life, the potential for causing subsequent greater damage to the beach, and their erosion effect on downdrift beach or shorefront areas.

For example, as discussed in Chapter 9 of the CRC Handbook of Coastal Processes and Erosion (1983), walls built perpendicular to the beach, namely jetties, have been found to block the littoral drift By doing so, the sand is prevented from reaching the downdrift side so that while sand is captured at the desired location, neighboring downdrift locations erode even faster. Likewise, a groin, which is a rib built approximately perpendicular to the beach or shoreline, traps the littoral drift so that the local updrift side of the shoreline is built up. Unfortunately, as with jetties, groins build up the updrift side by preventing sand from reaching the downdrift side so that the neighboring downdrift side erodes even faster. The building of several groins in succession increases the build-up of the updrift side, while simultaneously increasing the rate of erosion of the downdrift side. Further, jetties, groins, and other such breakwater means are designed to be struck by waves. This action causes their bases to erode rather quickly, and therefore these structures shall readily require replacement. Still further, these type structures are very costly to construct.

Walls constructed parallel to the shoreline, such as longard tubes, seawalls and bulkheads or breakwaters, deflect waves, instead of absorbing the waves. Accordingly, these structures also erode rather quickly, thus causing their materials to wash-up on the shorefront. Also, each of these structures has been found to produce other deleterious effects. For example, Coastal Engineering, 8 (1984) pp. 199–217, in an article titled: Performance Documentation of the Longard Tube at Del Mar, Calif. 1980–1983 by R. E. Flick and B. W. Waldorf, states that the study monitoring the Longard Tube installation at Del Mar beach from December 1980 until early 1983 principally concluded that the tube as configurated was not an substantial enough barrier to effectively prevent beach erosion during severe storm events. Specifically, the Longard Tubes, which are low cost sand filled plastic tube devices positioned parallel to the shoreline, were found inadequate to prevent large waves from overtopping the tube thereby producing localized sand scour on the shoreward side as the water returned seaward. As the scouring continued, the water returning seaward poured over the tube and began to also scour channels on the tube's seaward side. This process continued to perpetuate until the tubes were rendered totally ineffective. Also, a seawall, as stated in CRC Critical Reviews in Environmental Control, September 1976, pp. 259–296, in an article titled: Beach Erosion: Causes, Processes, and Remedial Measures by Dean, results in greater erosion at the location of the seawall toe than if the seawall were not present. Further, the seawall, as with any structure deflecting the waves, has its base scoured out so that the base of the seawall will eventually erode.

Recognizing the ineffectiveness of the above known processes to abate erosion, others have directed their attention decreasing the energy in waves before the waves strike the shorefront. For example, U.S. Pat. No. 3,197,963 to Frederiksen, which issued on Aug. 3, 1965, is directed to an apparatus which serves as a temporary breakwater by attempting to attenuate the wave action and to decrease the relative height of the peak with respect to the bottom of the trough of the wave. Specifically, the apparatus includes a plurality of enclosed, elongated hollow bodies oriented in a single row and in side-by-side relation so that each of the elongated bodies extends in the direction of wave travel. Each body has a bladder-like upper portion and a rigid bottom. The enclosed body is provided with a quantity of gaseous fluid, such as air, preferably up to approximately 40% to 60% of its volume capacity. When the hollow tube is anchored in a submerged location beneath the surface of the water, it operates as follows. As the crest of the wave imposes upon the top exterior of the partially inflated hollow body, the bladder upper portion collapses under the crest to thereby collapse a portion of the chamber. However, due to the influence of the water at the trough, the air pocket formed under the trough travels along the hollow body. This action causes a collapse of the wave crest and the filling of the trough by the generation of another wave. Clearly, this is a temporary measure which would necessarily not last for a long period of time due to the natural dissipation of the gas, as well as the probability that it would not have any significant effect on high frequency waves.

An apparent attempt to combine the deflection and wave absorption or abatement concepts to abate erosion is U.S. Pat. No. 1,353,001 to Uriarte, which issued on Sept. 14, 1920. It is directed to a breakwater or the like. Specifically, the breakwater includes a solid masonry or other suitable structure comprising a series of substantially horizontal perforated diaphragms one above the other, and vertical cutwaters in front of the diaphragms. Waves striking the structure are divided into a number of vertical sections, and then are subdivided vertically by the diaphragms. The problem with this structure is that it is costly, and possibly may erode by the water striking it.

SUMMARY OF THE INVENTION

Against the foregoing background, it is primary object of the present invention to provide a wave abatement device which serves as an erosion abatement device.

It is another object of the present invention to provide such an abatement device which dissipates the energy of the wave prior to striking the shorefront thereby reducing the turbulence of the wave.

It is a further object of the present invention to provide such an abatement device which shall reduce the turbulence of the wave by flattening or running-out the trough of the wave.

It is still another object of the present invention to provide such an abatement device which shall direct the wave force in a direction, usually perpendicular, to the shorefront.

It is yet another object of the present invention to provide such an abatement device which allows material, such as sand, normally found in the wave to be carried through the device and eventually on the shorefront.

It is yet still another object of the present invention to provide such an abatement device which does not interfere with littoral drift.

It is still yet another object of the present invention to provide such an abatement device which shall both transform high frequency or turbulent waves to calm water waves and direct the waves in the perpendicular direction towards the desired shorefront.

It is still a further object of the present invention to provide such an abatement device which strategically abates waves and then accretes the existing shorefront without the use of additional shorefront protection structures, and without any deleterious effect to downdrift shorefront.

To the accomplishments of the foregoing objects and advantages, the present invention, in brief summary, is a device for abating a wave and thereby abating erosion of a shorefront of a body of water. The device comprises a plurality of rows of elongated, hollow cylindrical tubes, said tubes in each row positioned in a side-by-side relation, and, preferably, each row of tubes being offset with respect to the adjacent row of tubes. The plurality of rows are also positioned so that their centerline is basically perpendicular to the shorefront. The device also comprises means for retaining the tubes in position with respect to each other, and may include means for securing the plurality of rows of tubes in position in the body of water.

BRIEF DESCRIPTION OF THE DRAWINGS

The foregoing and still other objects and advantages of the present invention will be more apparent from the following detailed explanation of the preferred embodiments of the invention in connection with the accompanying drawings wherein:

FIG. 1 is a perspective view of first embodiment of the device of the present invention;

FIG. 2 is a front elevation view of the device of FIG. 1;

FIG. 8 is a side view of the device of FIG. 7;

DESCRIPTION OF THE PREFERRED EMBODIMENTS

Figure 7:
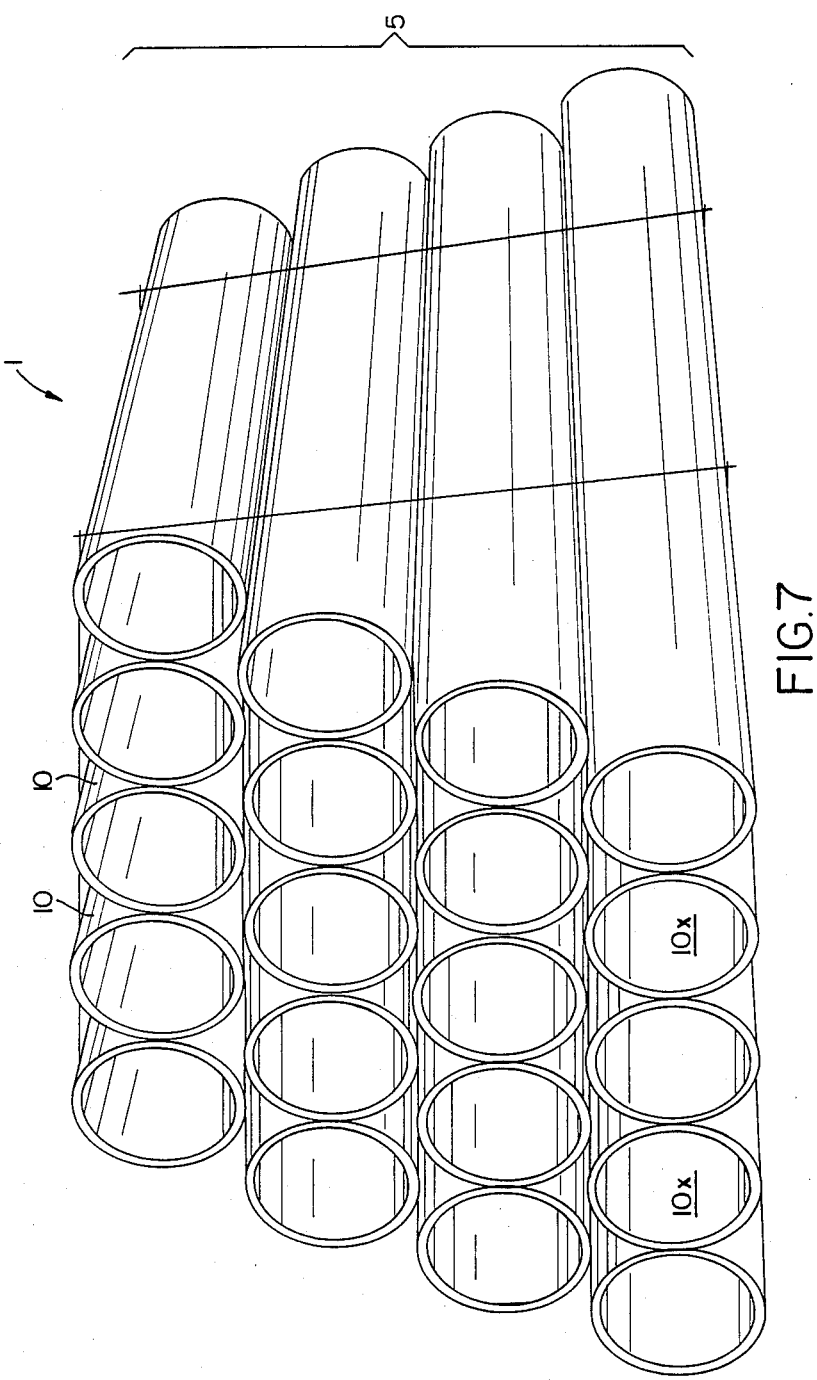
FIG. 7 is a perspective view of a second embodiment of the device of the present invention.

Referring to the Figures, and in particular FIGS. 1 and 7, there is provided a wave and erosion attenuation or abatement device or system generally represented by reference numeral 1. The device 1 has a plurality of rows 5 with each row having a plurality of tubes 10. Each of the tubes 10 in a row are, preferably, cylindrical, and are positioned in a contiguous or side-by-side manner to its adjacent tubes in that row. Further, all of the tubes 10 in the row 5 are positioned basically on the same horizontal plane. Except for perhaps two or three tubes 10x in the lowest row, which tubes may be filled with styrofoam plastic to assure neutral buoyancy of the device 1, all of the tubes 10 are hollow.

As shown in FIG. 2, and referring to the embodiments of FIG. 7 as well as FIG. 1, each row of tubes 10 is staggered with respect to its adjacent rows of tubes in the widthwise or radial direction of the device 1. The radial staggering of the rows 5, which in the embodiment shown consists of rows 51 through 54, is such that the tubes in the even rows, and likewise the tubes in the odd rows, align vertically with respect to each other. For example, tube 10a of the first row 51 rests on two tubes 10a and 10b of the adjacent, second row 52 and does not vertically align with tube 10a of that second row 52, yet tube 10a in the first row 51 does align in the vertical plane with tube 10a of the third row 53. It should be understood that each tube 10a in each row 51-54 could be placed in vertical alignment (not shown), but the staggered arrangement is preferably used simply because it is easier to hold or retain the tubes in place in the device 1 in the staggered versus the vertically aligned arrangement.

Each tube 10 in each row 5 (rows 51 to 54) is positioned so that the one open end 12 of the tube faces directly toward the shorefront and the other open end 12 faces directly away from the shorefront, i.e. the centerline or axis C of each elongated tube 10 is basically perpendicular to the shoreline of the beach. Thus, the centerline C of each of the plurality of tubes 10 is in the direction of the wave propagation.

Figure 3:
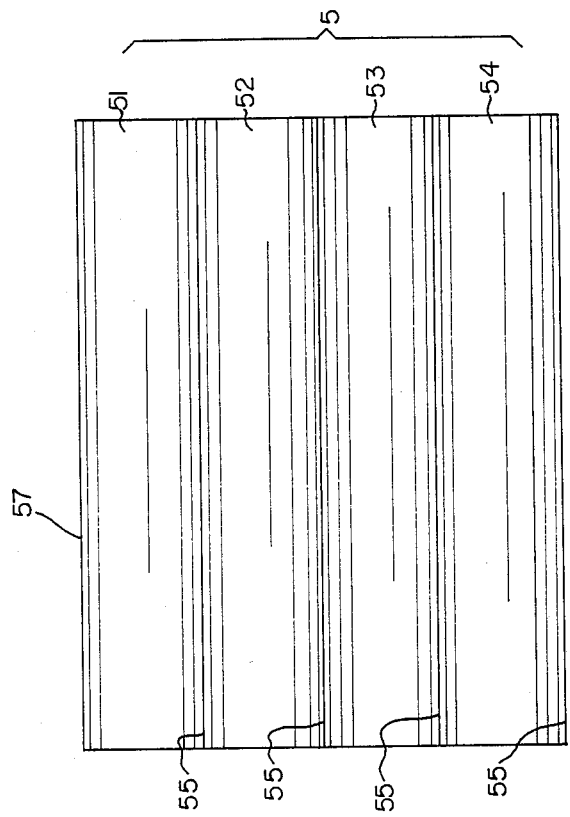
FIG. 3 is a side elevation view of the device of FIG. 1.

It is believed that in all embodiments the topmost row of tubes should never have an axial length greater than any of the lower rows of tubes. Specifically, referring to FIG. 3, each tube 10 of each row 5 and each row of tubes have the same axial extent so that when viewed from the side the device 1 forms a rectangular, and not a pyramid, shape.

Referring to FIG. 8, in the alternative embodiment (FIG. 7), the first row 51 and a portion of the second row 52 of tubes 10 are positioned above the calm water line. The tubes of the first row 51, preferably, are of an axial extent which is less than the tubes of the second row 52. Likewise, the tubes 10 of the second row 52, preferably, are of an axial extent less than that of the third row 53. However, the third row 53, preferably, is of an axial extent equal to that of the fourth row 54. Thus, as viewed from the side, the first three rows of tubes 10 of device 1 form a pyramid. The pyramid shape is believed preferred, as will be explained below, since that shape better assists in abating a turbulent wave. It should be understood that the calm water line means the top surface of the water when the water is at rest.

The number of rows 5 of tubes 10 in the device 1 may vary according to the depth of the floor of the body of water where the device is placed, the distance of the device 1 from the shoreline, the height and frequency of the waves, especially the turbulent waves found in that area, and the topography of the area. It should be noted that the present invention can be used in any type of body of water, such as an lake, marina, ocean, river or sea, however, which alternative is used may depend on whether the device is used to abate waves intended to strike a shorefront or intended to strike a marina or other structure.

It is preferred that the device 1 has no greater than three or four horizontal rows of tubes for the obvious reasons of reducing the size, weight and thus the cost of the device. In one preferred embodiment, at least one row should be positioned above the calm water line, the second row should be at or partially above the calm water line and the third and fourth rows are completely in the body of water. While the third row has an effect on the wave, the fourth row should be relatively uneffected by the wave. The fourth or uneffected row by its placement within the body of water acts to provide neutral buoyancy, i.e. stabilization or minimization of the vertical bouncing of the device 1. The stabilization of vertical bouncing is needed so that the waves strike the intended portion of the device 1 without having to add additional portions to the device. In another preferred embodiment, all four of the rows are below the calm water line. Specifically, the top of the top row 51 just touches the calm water line. This embodiment may be preferred if the aesthetics of the area is important since, clearly, the device shall basically be hidden in the water.

The diameter, and thus the vertical height of the tubes 10, of each row 5 may also increase from the top to the bottom row of the device 1. Therefore, the diameter of the tubes 10 of row 51 could be smaller than the diameter of the tubes 10 of row 52. Again, the reason for this is to reduce the overall weight of the device 1, yet not reduce the efficiency of the device.

The distance the device 1 is placed from the shorefront is determined by the environmental criteria of the area. The objective is to place the device as far as possible from the shorefront so as to maximize the area of shorefront build-up and for the aesthetic reason of not having any structure in water near the shoreline. However, the distance from the shoreline or shorefront is limited by the fact that the device can not be too far from the shoreline so as to permit winds to get between the device and the shorefront and thus create other undesired conditions. For example, in the eastern end of the south shore of Long Island in New York State, it has been found that the tubes should be placed, as measured from the center line of the axial length, approximately two hundred to three hundred feet from the shoreline. At this position, the depth of the water is approximately twenty to twenty-five feet. It is preferred that the device 1 is high enough out of the water so that no more than approximately twenty percent of the highest wave would reach the top of the top row 51 of tubes, i.e. the top of the device 1. Specifically, the top to the midpoint of the second row 52 of tubes would be at the calm water line, and the bottom of the bottom or fourth row 54 of tubes 10 would be approximately ten to fifteen feet from the floor 60 of the body of water. It is believed that by this placement the device 1 shall achieve optimum reduction or abatement of all waves, no matter how turbulent. Moreover, the device 1 by this placement does not obstruct the desired littoral drift since that drift would pass under the device.

To also optimize wave abatement, the tubes 10 in each row 5 have the radial staggering as shown in FIG. 8. By the staggering, the trough of the wave starts to contact the lower row before the peak of the wave has reached the next, upper row. Accordingly, the abatement of the wave shall start sooner, yet the structure shall be less in size and in weight.

The tubes 10 can be made of any material which will not be eroded by the water. Specifically, the tubes 10 can be made of plastic, aluminum or any other non-corrosive materials. The reason plastic or aluminium is preferred is they are readily available, relatively inexpensive, light in weight and easily workable.

As shown in FIGS. 1 and 2, all of the tubes 10 are held together to form the device by a frame 20. The frame 20 can be of any configuration provided it retains all of the tubes 10 in place. It is suggested that the frame 20 includes at least a first pair of horizontal supports 22 adapted to be positioned across the top of the top of the top row 51 of tubes, a second pair of horizontal supports 24 adapted to be positioned across the bottom of the bottom row, in the embodiment shown the fourth row 54, of tubes, and a plurality of elongated, vertical supports 26 adapted to connect a support 22 to a support 24 by conventional means, such as brackets and bolts 28.

The primary criteria for the selection of the frame 20 material is that the material be made of any non-corrosive material, such as plastic, aluminum or wood, yet the material be strong enough to hold the bundle of tubes tight enough together to prevent movement of the individual tubes, especially during high or turbulent waves. A secondary criteria is that the material should again be readily available, relatively inexpensive, light in weight, and easily workable.

The entire device can be anchored to the floor 60 of the body of water or in the body of water by an anchoring means 50. As with the tubes 10 and the frame 20, the anchoring means can be made of any material which is non-corrosive. The primary function of the anchoring means is to minimize the amount of shifting of the device towards the shorefront. A second, but less important function, is that the anchoring means assists in having the device obtain a neutral buoyancy. While the exact anchoring structure is not important, it is believed that a block and tackle arrangement may suffice.

Concerning the operation of the device 1, waves directed to the shoreline are normally directed at various angles toward the shoreline. Significantly, the waves enter the opened front end 12 opposite the shoreline of each tube 10 so that each tube redirects the waves through the tubes, i.e. in the direction basically perpendicular to the shoreline or the wave propagation direction. Each tube 10, for purposes of wave propagation discussions, is broken down into areas 30, 31 and 32 which are enlarged in FIGS. 4 through 6, respectively. As defined in the present invention and as universally defined, a short wave is usually a high turbulent wave 40, i.e., one in which the crest 42 and the trough 44 is rather large in comparison to the period and subsequent waves occur in rapid succession. It should be noted that turbulent waves are short period waves and these are the waves that cause the greatest damage to the beach or shorefront since they provide much less time for sand in the wave to be deposited on the shorefront and their continued striking of the shorefront causes erosion of the sand already on the shorefront.

Figure 4:
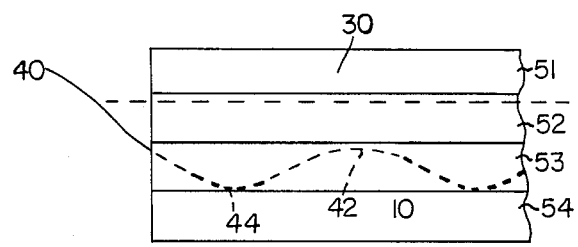
FIG. 4 is an exploded segment view of the segment from front end to line 4—4 of FIG. 3.
Figure 5:
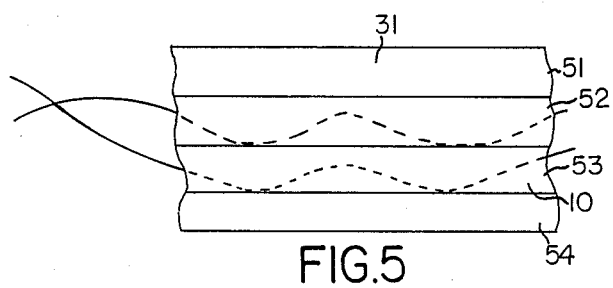
FIG. 5 is an exploded segment view of the segment from line 4—4 to line 5—5 of FIG. 3.
Figure 6:
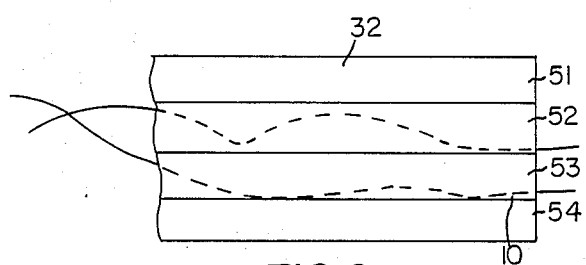
FIG. 6 is an exploded segment view of the segment from line 5—5 to backend of FIG. 3.

As shown in FIG. 4, waves 40 when first entering the hollow tubes 10 have a very high frequency. As the waves pass through the tubes, as shown in FIGS. 5 and 6, the water of the trough of the wave is attracted to and tries to follow the exposed top surfaces of the tube, specifically the inside surface of the base 55 of each tube 10 of each row that effects the wave, specifically, rows 51-53 and the exposed top surface 57 of topmost row 51 of the tubes. The exact phenomena is not known, however it has been found that the trough or portion of the wave that contacts these surfaces is attracted thereto thereby causing the wave to flatten or run-out as close to the surface as possible. As the waves 40 continue through the tubes, as shown in FIGS. 5 and 6 and the wave portion continues to contact the surface, the waves continue to flatten or run-out so that the waves exiting the tubes 10 have very little height and therefore are calm. Accordingly, it is believed that any surface which is made to contact the trough of the waves shall attract the wave and cause it to become calmer, however the surface should be relatively flat and long enough so that the wave's trough contacts the surface for a sufficient duration. Therefore, the length or the axial extent of the tube or device is important. One would prefer to have it as short as possible for the reasons of minimizing cost in materials and labor, workability, and less obtrusive to the public. It is believed, however, that to optimize effectiveness, the axial length of the tubes which effect the wave should be approximately one half of the axial extent of the period of the wave, and the axial length of the tubes in the row 54 uneffected by the wave, the base row, should be slightly longer than the axial extent of the period of the wave in order to provide stability to the device 1. It is also believed that a correlation should exist between the diameter and the axial length of a tube. Specifically, the axial length of a tube should be approximately six to eight times more than the diameter of that tube for the tubes which have an effect on the wave. It is further believed that there may be a correlation between the height of the device and the height of the wave. Specifically, it is believed that the height of the device should be approximately five times the height of the wave.

To test the theory of whether the waves are attracted to the exposed surfaces of the device so the the wave is abated, a model of this device was constructed. Specifically, a one-quarter scale model of a two-dimensional section of the system was designed and constructed to fit within a twelve foot wide tank. The model's width was limited to eleven and one-half feet to correspond to a forty-six section of a proposed approximately 200 foot width system. The model tested included a plurality of cylindrical tubes stacked in the arrangement shown in FIG. 1. Further, the device was positioned in the water so that the top of the top row touched the calm water line of the water. The inside diameter of the tubes were approximately 2.75 feet, the outside diameter of the tubes were approximately 2.79 feet, and the length of the tubes were approximately 16 feet. The overall height of the device was approximately 10.33 feet since all of the tubes in all of the rows had the same inside and outside diameters, however as mentioned above it is preferable that the diameters of the tubes of the rows out of the water be less than those in the water and that the reduction be a gradual reduction. The following Table 1 is a chart correlating the model to what would be a full scale of that device.

TABLE 1

|  | Model | Full Size |
|---|---|---|
| Scale Factor | ¼ | 1 |
| Tube Length, ft | 4 | 16 |
| Tube Diameter, ft |  |  |
| Outside | 0.70 | 2.79 |
| Inside | 0.69 | 2.75 |
| Water Depth, ft | 5 | 20 |
| Tube Group Height, ft | 2.58 | 10.33 |
| Tube Group Width, ft |  |  |
| 2 - Dimensional in tank | 11.5 | 46 |
| Design Value |  | 200 |
| Wave Height Sensor Location, ft |  |  |
| Forward of Tube Front | 36 | 144 |
| Aft of Tube Back | 36 | 144 |
| Distance Below Water Surface, ft |  |  |
| Top of Tubes | 0 | 0 |
| Pitot Tube Centerline | 1.60 | 6.42 |
| (3rd row of tubes down) |  |  |
| Distance Back from Tube Front, ft |  |  |
| Pitot Tube 1 | 0.5 | 2 |
| 2 | 2.0 | 8 |
| 3 | 3.5 | 14 |
| Support Strut Centerline, ft |  |  |
| Forward | 0.75 | 3 |
| Aft | 3.25 | 13 |
| Pitching Moment Axis, ft |  |  |
| Above Water Surface | 1.12 | 4.47 |
| Aft of Tube Front | 2 | 8 |

The following Table 2 charts the characteristic dimensions and particulars of the various shallow water wave lengths and heights tested. Wave heights were calibrated, and wave lengths and velocities, known as wave form velocities, are the true shallow water value for the twenty foot water depth (full scale) tested.

TABLE 2

| | Full Scale with 20 ft Water Depth | | | | |
|---|---|---|---|---|---|
| Length ft | Wave Length Tube Length | Period sec | Height ft | Length Height | Celerity fps |
| 24 | 1.5 | 2.17 | 2.0 | 12.0 | 11.1 |
| 32 | 2.0 | 2.50 | 2.7 | 12.0 | 12.8 |
| 40 | 2.5 | 2.80 | 3.3 | 12.0 | 14.3 |
| 80 | 5.0 | 4.13 | 6.0 | 13.3 | 19.4 |
| 120 | 7.5 | 5.48 | 4.0 | 30.0 | 21.9 |
| 160 | 10.0 | 6.90 | 3.2 | 50.0 | 23.2 |
| 200 | 12.5 | 8.37 | 2.4 | 83.3 | 23.9 |
| REDUCED WAVE HEIGHT FOR FORCE AND MOMENT DATA | | | | | |
| 40 | 2.5 | 2.80 | 1.0 | 40.0 | 14.3 |
| 40 | 2.5 | 2.80 | 2.0 | 20.0 | 14.3 |
| 80 | 5.0 | 4.13 | 1.0 | 80.0 | 19.4 |
| 120 | 7.5 | 5.48 | 1.0 | 120.0 | 21.9 |
| 160 | 10.0 | 6.90 | 1.0 | 160.0 | 23.2 |
| 200 | 12.5 | 8.37 | 1.0 | 200.0 | 23.9 |

The relevant equation for computing shallow water wave characteristics is the following:

(1) $T = L/C = L_o/C_o = \sqrt{(2\pi/g)L_o} = (2\pi/g)C_o$
(2) $C = C_o \tan h (2\pi d/L)$
(3) $L = L_o \tan h (2\pi d/L)$
(4) $C^2 = (g/2\pi) L \tan h (2\pi d/L)$
(5) $C_o^2 = (g/2\pi)L_o$ where
T = wave period, sec (same for shallow and deep water)
L = wave length in shallow water, ft
$L_o$ = wave length at same period in deep water, ft
C = wave celerity in shallow water (wave form velocity), fps
$C_o$ = celerity at same period in deep water, fps
d = water depth, ft
H = wave height, ft
g = acceleration due to gravity, 32.2 fps The following measurements were made as a function of time (full scale values are given):
1. Wave height at a point 144 feet ahead of the system ("before").
2. Wave height at a point 144 feet after the system ("after").
3. Total hydrodynamic lift force.
4. Total drag force.
5. Total pitching moment about an axis
  (a) 4.5 feet above the still water surface
  (b) 8.0 feet of the forward end of the tubes (above the centerlines).

It is estimated that the precision of the full-scale results is within the following limits:
Wave height: ±0.07 feet
Wave length: ±0.1 feet
Wave period: ±0.002 sec.
Forces: ±4 lb. per ft. of width
Moments: ±16 ft. lb. per ft. of width.

Figure 10:
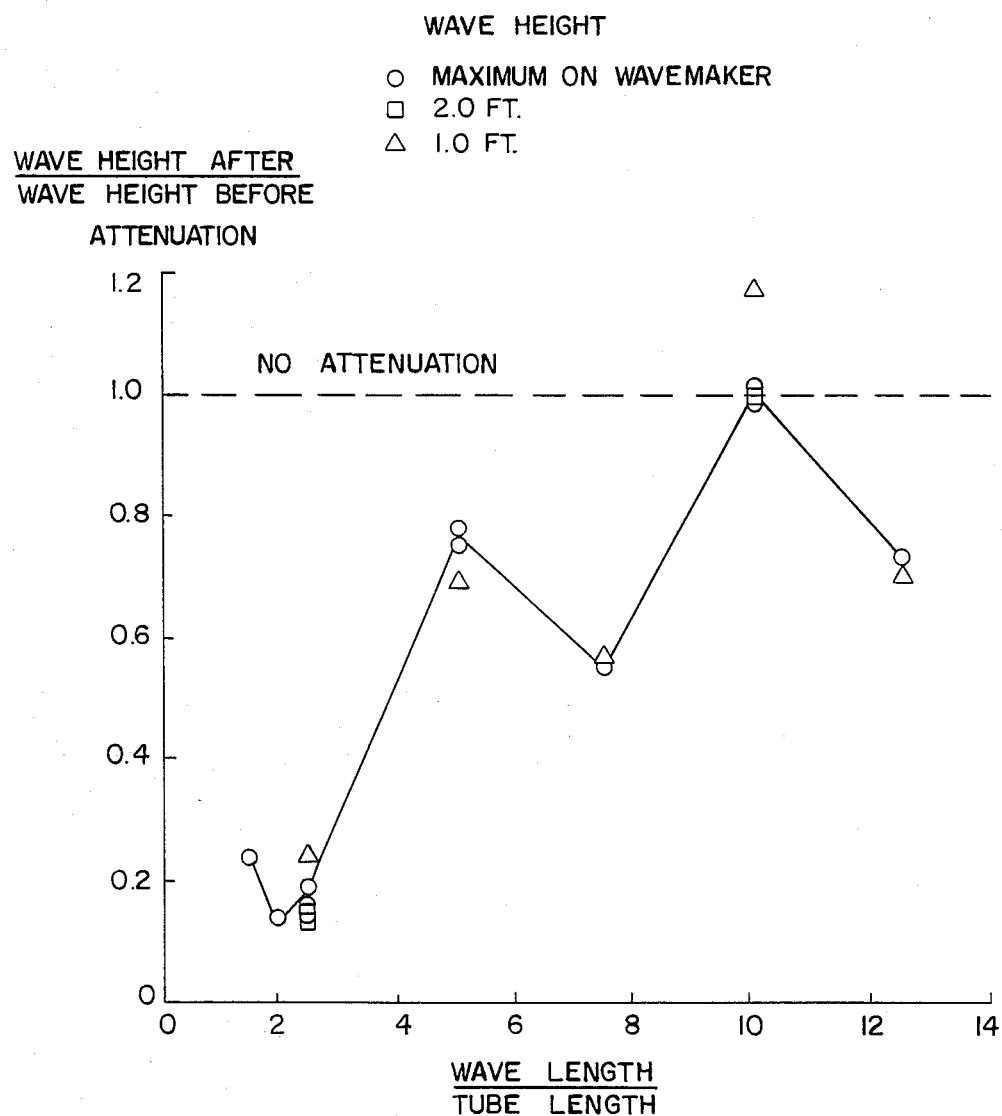
FIG. 10 is a chart showing a graphical representation of Table 3.
Figure 11:
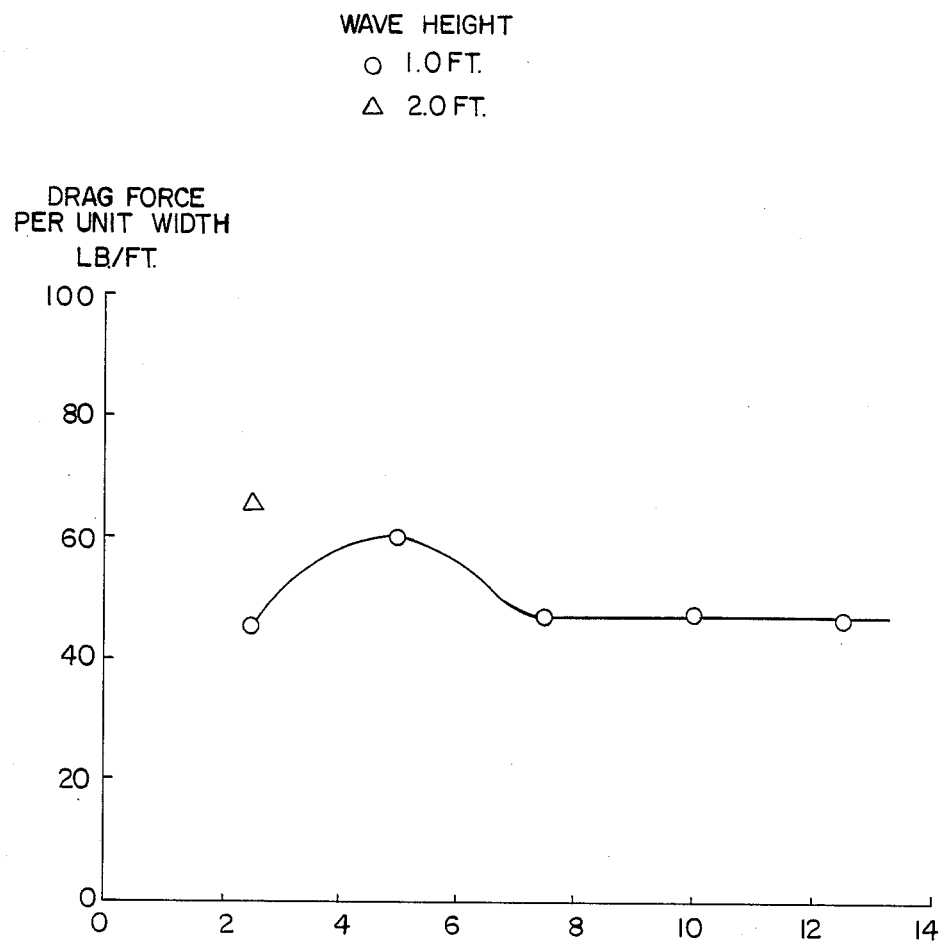
FIG. 11 is a chart showing a graphical representation of Table 4.

The Tables 3 and 4 below present the full scale results of all valid test runs. The runs where deemed invalid because difficulties in effecting the run. Table 3 charts the wave attenuation results determined by dividing the wave height of 144 feet "after" the device by the wave height 144 feet "before" the device. FIG. 10 provides this factor as a function of wave length/tube length. Table 4 gives the measured average minimum and maximum values of lift force, drag force and pitching moment per unit width of the device or system, while FIG. 11 shows the drag per unit width as a function of wave length/tube length.

TABLE 3

WAVE ATTENUATION RESULTS
Full Scale with 20 ft Water Depth

| Run | Length ft | Wave Length Tube Length | Period sec | Height ft | Length Height | Attenuation Height After Height Before |
|---|---|---|---|---|---|---|
| BALANCE LOCKED OUT FOR SAFETY | | | | | | |
| A | 24 | 1.5 | 2.17 | 2.0 | 12.0 | 0.24 |
| B | 32 | 2.0 | 2.50 | 2.7 | 12.0 | 0.14 |
| C | 40 | 2.5 | 2.80 | 3.3 | 12.0 | 0.16 |
| D | 40 | 2.5 | 2.80 | 3.3 | 12.0 | 0.15 |
| E | 40 | 2.5 | 2.80 | 3.3 | 12.0 | 0.19 |
| F | 80 | 5.0 | 4.13 | 6.0 | 13.3 | 0.78 |
| G | 80 | 5.0 | 4.13 | 6.0 | 13.3 | 0.75 |
| H | 120 | 7.5 | 5.48 | 4.0 | 30.0 | 0.55 |
| I | 160 | 10.0 | 6.90 | 3.2 | 50.0 | 0.99 |
| J | 160 | 10.0 | 6.90 | 3.2 | 50.0 | 1.00 |
| K | 160 | 10.0 | 6.90 | 3.2 | 50.0 | 1.01 |
| L | 200 | 12.5 | 8.37 | 2.4 | 83.3 | 0.73 |
| REDUCED WAVE HEIGHT FOR FORCE AND MOMENT DATA | | | | | | |
| M | 40 | 2.5 | 2.80 | 1.0 | 40.0 | 0.24 |
| N | 40 | 2.5 | 2.80 | 2.0 | 20.0 | 0.13 |
| O | 80 | 5.0 | 4.13 | 1.0 | 80.0 | 0.69 |
| P | 120 | 7.5 | 5.48 | 1.0 | 120.0 | 0.57 |
| Q | 160 | 10.0 | 6.90 | 1.0 | 160.0 | 1.17 |
| R | 200 | 12.5 | 8.37 | 1.0 | 200.0 | 0.70 |

TABLE 4

FORCE AND MOMENT RESULTS
Full Scale with 20 ft Water Depth

| Run | Wave Length ft | Wave Length / Tube Length | Wave Height ft | Amplitude Per Unit Width | | |
|---|---|---|---|---|---|---|
| | | | | Lift lb/ft | Drag lb/ft | Moment ft-lb/ft |
| S | 40 | 2.5 | 1.0 | 135–143 | 45–38 | 569–1152 |
| T | 40 | 2.5 | 2.0 | 148–409 | 65–50 | 1329–2687 |
| U | 80 | 5.0 | 1.0 | 244–319 | 60–45 | 875–1185 |
| V | 120 | 7.5 | 1.0 | 328–390 | 47–35 | 675–691 |
| W | 160 | 10.0 | 1.0 | 393–427 | 47–34 | 356–372 |
| X | 200 | 12.5 | 1.0 | 429–461 | 46–27 | 323–251 |

Table 4 shows that wave lengths of from 1.5 to 2.5 times the tube length reduce the approaching wave height to from one-quarter to one-seventh of its height at 144 feet shoreward for 20 feet deep water. The testing leads one to believe that at longer wave length/tube length the attenuation is lessened and that wave lengths which are 10 times the tube length pass right through the system with no apparent attenuation. Accordingly, the wave length/tube length ratio is significant in choosing the precise length of tube to be selected in any specific system.

It should be noted that during the test of the scale model it was found that the expected drag force per unit width required to hold the tubes and device in place were between 45 to 60 lb. per ft. of width in 1.0 ft. high waves. Therefore, for a 200 ft. width system, it is believed that from 9000 to 12000 lb. of restraining force would be needed to keep the device or tubes in place. Some data for 2.0 ft. wave height showed that 65 lb. per ft. or 13000 lb. would be needed for the full 200 ft. width wave attenuation system at a wave length/tube length ratio of 2.5. Accordingly, the precise anchoring means must be able to supply the above lbs. of restraining force.

Figure 9:
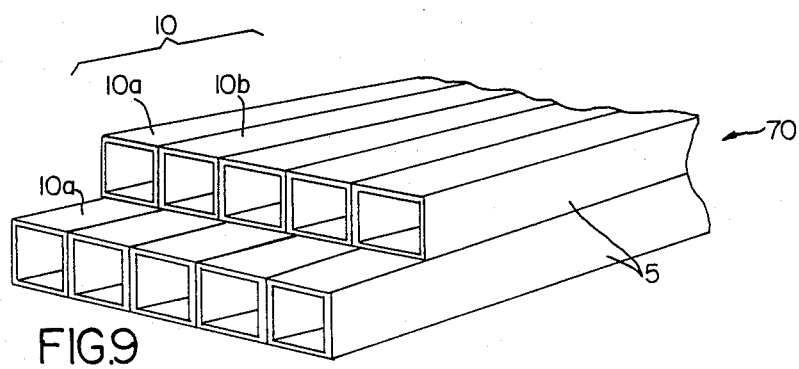
FIG. 9 is a perspective view of a third embodiment of the device of the present invention

FIG. 9 is another embodiment of the wave attenuation device or system of the present invention (however only two of the four rows of tubes are shown). In this embodiment, the erosion abatement device or wave attenuation system 70 includes a plurality of rows 5 elongated rectangular shaped tubes 10. As with the first embodiment of FIG. 1, preferably, there are four, basically horizontal rows. However in this embodiment, each tube 10a is vertically aligned with each tube 10a on every horizontal row. The material of these tubes and the placement of these tubes with respect to the distance from and alignment with the shoreline is the same as that with respect to embodiment. Possible alternative embodiments, which have not been shown in the Figures, include an embodiment in which the plurality of tubes are cylindrical, like those in the first embodiment, however the tubes (10a) in each row vertically align with respect to each other in accordance with the vertical tube alignment shown in FIG. 9.

By the present invention, it has been found that turbulent waves directed at an angle other ninety degrees toward the beach or shoreline, are redirected in the direction of wave propagation, i.e., perpendicular to the shoreline by the plurality of tubes 10 that compose the device or system 1. Further, the system attenuates the waves by flattening or running-out the trough and thus the waves, so as to produce a calming effect such that the resulting waves, i.e., waves exiting the tubes and striking the shorefront, are calm. Still further, the particular structure does not adversely effect littoral drift.

Having thus described the invention with particular reference to the preferred forms thereof, it will be obvious that various changes and modifications may be made therein without departing from the spirit and scope of the invention as defined by the appended claims.

Wherefore, I claim:

1. A wave abatement device for dissipating the energy of waves intended to strike a shorefront of a body of water, said device comprises:

at least three rows of elongated, hollow cylindrical tubes, said tubes in each row positioned in a side-by-side relation, each tube of said at least three rows of tubes being positioned in the same direction and with the centerline of each row basically perpendicular to the shorefront and basically parallel to the calm water surface of the body of water, said tubes of said at least three rows receive therethrough waves from the body of water, said at least three rows of tubes being buoyant in the body of water with said first row being positioned above the calm water line, said second row being positioned approximately at the calm water line, and said third row being positioned below the calm water line of the body of water and above the floor of the body of water; and means for retaining said at least three rows of tubes in position with respect to each other, wherein waves exiting said device are calm as compared to the same waves as they entered said device.

2. The wave abatement device of claim I, wherein each adjacent pair of rows of said at least three rows are staggered with respect to each other.

3. The wave abatement device of claim 1, wherein said at least three rows of tubes includes at least four rows of tubes.

4. The wave abatement device of claim 3, wherein said at least four rows of tubes includes two rows of tubes which are positioned above the calm water line of the body of water.

5. The wave abatement device of claim 5, wherein said two rows of tubes have an axial extent less than that of the remaining rows of said at least four rows of tubes, and wherein between said two rows of tubes the topmost row has an axial extent less than that of the other of said two rows.

6. The wave abatement device of claim 1, further comprising means for anchoring said device in position in the body of water.

7. The wave abatement device of claim 1, wherein each tube of said at least three rows of tubes is made of a non-corrosive material.

8. The wave abatement device of claim 1, wherein said means for retaining said plurality of rows of tubes in position with respect to each other includes at least a pair of first horizontal supports, at least a pair of second horizontal supports, a plurality of vertical supports with each vertical support connecting one first support to one second support, and means for connecting the vertical supports to the first and second horizontal supports.

9. The wave abatement device of claim 1, wherein said at least three rows of tubes are at least four rows of tubes with two rows above the calm water line of the body of water, and wherein said two rows above the calm water line and the first row below the calm water line are effected by the wave entering said device, and wherein the axial extent of the rows effected by the wave increases from the topmost to the first row below the calm water line.

10. The wave abatement device of claim 9, wherein the axial extent of each of tube of said two rows is six to eight times greater than the diameter of that tube.

11. The wave abatement device of claim 1, wherein the height of said device is approximately five times greater than the height of an average turbulent wave in the area of said device.

12. The wave abatement device of claim 1, wherein said first, second and third rows of tubes have a different axial extent with said first row having an axial extent less than that of said second row and said second row having an axial extent less than that of said third row.

* * * * *